US007781502B2

(12) United States Patent
Cheng et al.

(10) Patent No.: US 7,781,502 B2
(45) Date of Patent: Aug. 24, 2010

(54) SURFACE TREATMENT COMPOSITION, A MATERIAL AND A HYDROPHOBIC FILM FABRICATED FROM THE SAME

(75) Inventors: Hung-Chiao Cheng, Hsinchu (TW); Wen-Hann Chou, Sinjhuang (TW); Tsung-Tsan Su, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 133 days.

(21) Appl. No.: 11/790,024

(22) Filed: Apr. 23, 2007

(65) Prior Publication Data

US 2008/0153944 A1 Jun. 26, 2008

(30) Foreign Application Priority Data

Dec. 26, 2006 (TW) .............................. 95148908 A (51) Int. Cl.
*A61K 9/16* (2006.01)
*C08F 290/06* (2006.01)
*C08L 91/06* (2006.01)

(52) U.S. Cl. ........................... 524/56; 524/81; 524/277
(58) Field of Classification Search .................. 524/56, 524/277, 81
See application file for complete search history.

(56) References Cited

U.S. PATENT DOCUMENTS

| 4,184,099 | A | * | 1/1980 | Lindauer et al. | ............ 313/315 |
| 5,782,962 | A | * | 7/1998 | Burke et al. | .................... 106/2 |
| 7,381,250 | B2 | * | 6/2008 | Hasinovic et al. | ............. 106/10 |
| 2006/0204461 | A1 | * | 9/2006 | Pavlin | ......................... 424/64 |

* cited by examiner

*Primary Examiner*—William K Cheung
(74) *Attorney, Agent, or Firm*—Birch, Stewart, Kolasch & Birch, LLP (57) ABSTRACT

The present invention relates to a surface-treatment composition, a material and a hydrophobic film fabricated from the same. The composition of the invention comprises wax, silicone oil, C6 to C30 hydrocarbon mixtures, nano-particles and resin. The surface of materials treated with the composition of the present invention shows characteristics of nano roughness, low surface-energy, and low contact angle hysteresis.

24 Claims, 11 Drawing Sheets

SURFACE TREATMENT COMPOSITION, A MATERIAL AND A HYDROPHOBIC FILM FABRICATED FROM THE SAME

BACKGROUND OF THE INVENTION

1. Field of the Invention

The present invention relates to a composition for material surface treatment, and further relates to a hydrophobic film on a surface of a material.

2. Description of the Related Art

Surface Treatment Science is an important subject in Materials Science. The surface characteristics of a material can be modified by surface treatment, and then the material can be used in the other fields. The surface treatment can be divided into permanent and temporary surface treatments. The representative example of permanent surface treatment is electroplating, which depositing a metal or alloy film on a surface of a material through an electrochemical method, and causing long-term change the surface nature. However, specific equipments are needed in such treatments, and these treatments will not be easily operated for general user.

Temporary surface treatment refers to forming a film that can change the nature of material surface by artificial or mechanical processes. The binding force between the film itself and the material surface is not as strong as that produced from permanent surface treatment such as electroplating, so the film will be easily removed for the surface of the material But the development of materials which can form a temporary surface treatment film, e.g. paint, anti-fogging agent, and the formulation of polishing wax, still have certain commercial value because such materials is easy to be applied on the surface and no specific or large equipments are needed.

For example, the polishing wax can be used on the surface of furniture, especially wooden furniture, and the treatment of the polishing wax will not only well modify the wood but also prolong its life. In addition, it is a general and wide application in car care industry. Nowadays, the number of cars under these services in the world is approximately 500,000,000. Nearly 500,000 new cars are sold out every year in Taiwan, and the number of cars, which need car care services, is estimated as more than 3,000,000, and the consumption of car wax is obviously great. Car waxes of various brands can be found. Most of them emphasize their workability, gloss, durability, and water-repellency; however, the performances of water-droplet rolling and animal-repellency are both ignored. The output value of the waxes for car care is increasing year by year because the car owners would like to pay for maintaining the gloss and clean of their cars. In view of needs, the performance of these commercial car waxes in the present day still has room to be improved. These commercial car waxes have wax as the main component, which will be produced by mixing the wax with solvent, auxiliary agent, and filler. When these car waxes are spread on the baked coating layer of cars, they can flatten the unevenness of the coating layer, and achieve the purpose of being gloss and protected. Although some products get involved in nanotechnology and present a water-droplet having contact angle of about 106°, but the water-droplet rolling performance is not as good as expected.

Since then, the motive and research direction in the art is to develop a composition for surface treatment having high water-repellency and good water-droplet rolling performance.

SUMMARY OF THE INVENTION

In view of the disadvantages of conventional technology, the object of the present invention is to develop a composition for material surface treatment, which can make the treated surface of said material has characteristics of high water-repellency and good water-droplet rolling performance. Besides, the object of the present invention also comprises providing a hydrophobic film having characteristics of high water-repellency and good water-droplet rolling performance, which is fabricated on a surface of a material.

To achieve the above objects, the present invention provides a composition for material surface treatment, comprising: 100 parts by weight of wax; 0.1 to 40 parts by weight of silicone oil; 10 to 500 parts by weight of C6 to C30 hydrocarbon mixtures; 1 to 200 parts by weight of nano-particles; and 1 to 40 parts by weight of resin.

In some embodiments, the composition of the present invention can further comprise 0.1 to 30 parts by weight of animal repellent.

In some embodiments, the nano-particles of the composition of the present invention can be partially replaced with micro-particles.

The present invention provides a material having a hydrophobic surface, comprising: a material having a surface; and a hydrophobic film located on said surface; wherein said hydrophobic film is fabricated by using the composition for material surface treatment of the invention and coating the composition on the surface of said material.

Additionally, the present invention further comprises a hydrophobic film, which is fabricated by using the composition for material surface treatment of the invention and coating the composition on a surface of a material.

The present invention provides a composition for material surface treatment and a hydrophobic film fabricated from the same, wherein the film has advantages of high water-repellency and good water-droplet rolling performance; and can be used on a surface of a material, to achieve the effects of moisture proof and protection.

DETAILED DESCRIPTION OF THE PREFERRED EMBODIMENTS

The composition for material surface treatment of the invention comprises 100 parts by weight of wax; 0.1 to 40 parts by weight of silicone oil; 10 to 500 parts by weight of C6 to C30 hydrocarbon mixtures; 1 to 200 parts by weight of nano-particles; and 1 to 40 parts by weight of resin.

In a preferred embodiment, the composition for material surface treatment of the invention comprises 100 parts by weight of wax; 0.1 to 20 parts by weight of silicone oil; 10 to 400 parts by weight of C6 to C30 hydrocarbon mixtures; 1 to 100 parts by weight of nano-particles; and 1 to 20 parts by weight of resin.

The composition for material surface treatment of the invention can be used on the surface of the various materials, wherein the suitable material comprises, but not limit to, metal having no baked coating layer on its surface, metal having a baked coating layer on its surface, wood material, ceramic, leather, glass, or the likes.

The wax comprised in the composition for material surface treatment of the invention refers to the natural or synthesized wax contained in the general wax product for home use or car care, which comprises, but not limit to, petroleum wax, beeswax, Brazil wax, Carnauba wax or mixtures thereof, and which can decrease the surface-energy of the surface of the treated material.

The silicone oil comprised in the composition for material surface treatment of the invention refers to the silicone oils as the filler in the composition formulation used in industry or materials technology, and having no specific limitation. In the preferred embodiments of the present invention, the silicone oil selected further have the effect of softening the wax.

The C6 to C30 hydrocarbon mixtures comprised in the composition for material surface treatment of the invention is used as the matrix for blending the composition and functioned as same as the solvent of liquid composition. Said C6 to C30 hydrocarbon mixtures is straight or branched alkane compound having a formula of $C_nH_{2n+2}$, wherein n=6-30; and it also can be cycloalkane, aromatic compound, or unsaturated hydrocarbon having 6 to 30 carbon atoms. Since the oil is used as a blending matrix, these hydrocarbon mixtures used as blending matrix in wax formulation in the art are suitable for the present invention. The embodiment of C6 to C30 hydrocarbon mixtures comprises, but not limit to, cleaning naphtha, toluene, xylene, gasoline, diesel, kerosene, Stoddard solvent or mixtures thereof.

Figure 8A:
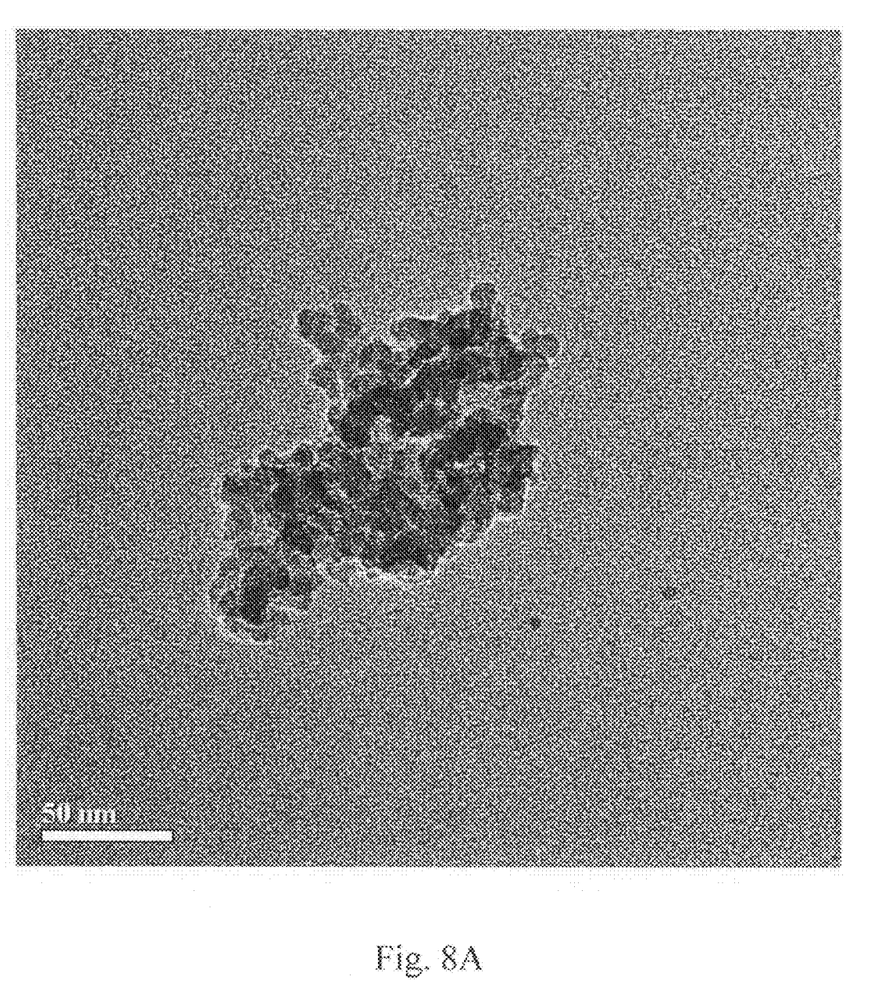
FIG. 8A is the electro-microscopic image of an embodiment of substantially non-spheral nano-particles.
Figure 8B:
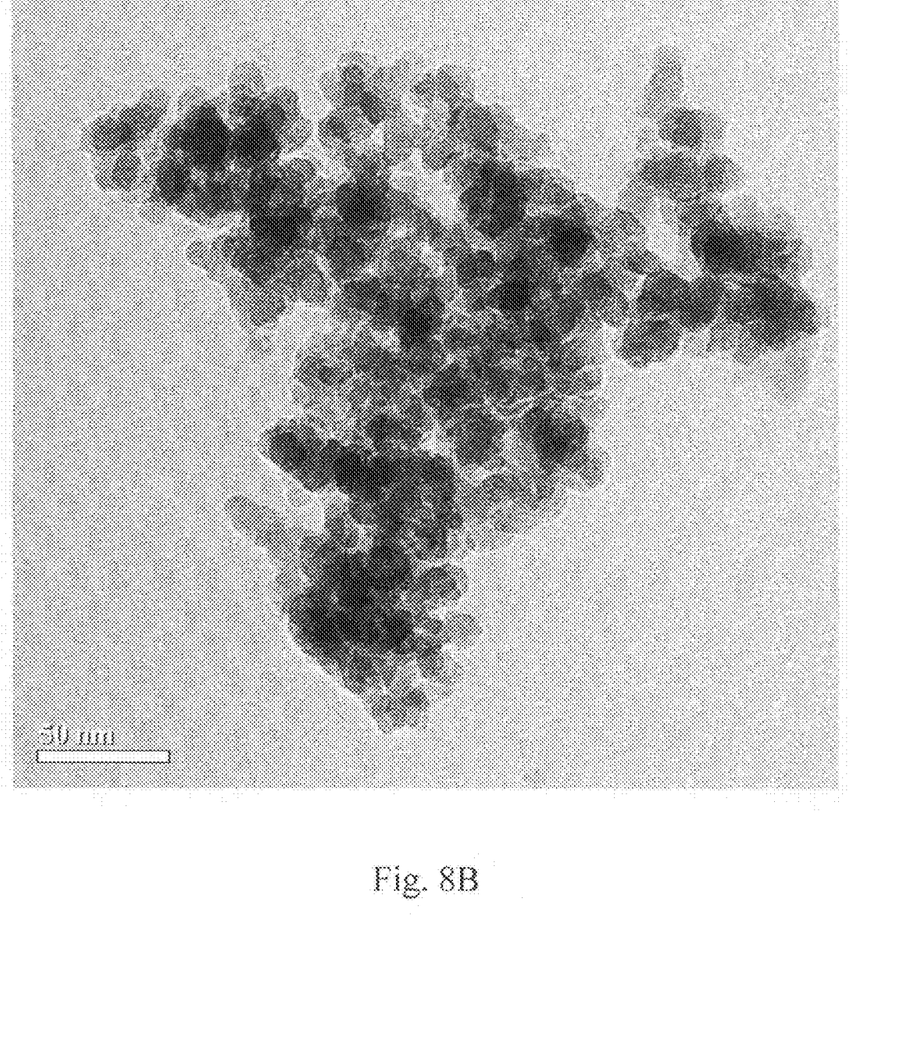
FIG. 8B is the electro-microscopic image of an embodiment of substantially non-spheral nano-particles which have different particle size from FIG. 8A.
Figure 8C:
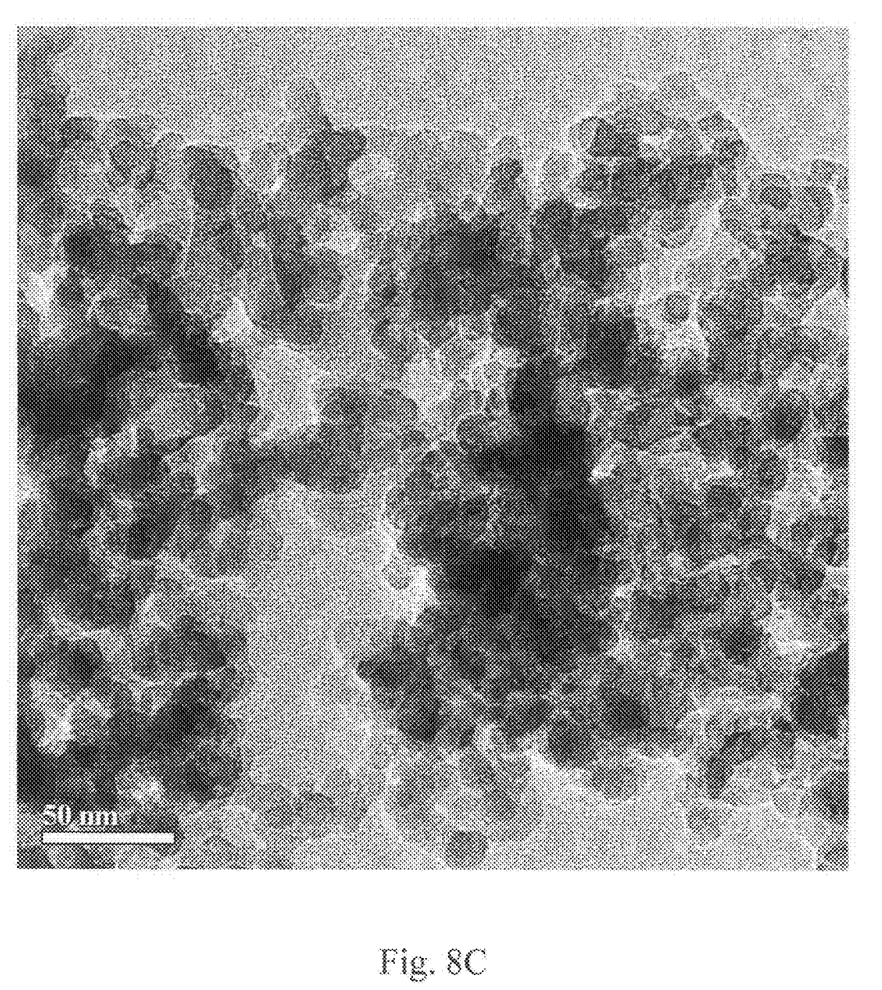
FIG. 8C is the electro-microscopic image of an embodiment of substantially non-spheral nano-particles which have different particle size from FIG. 8A and FIG. 8B.
Figure 8D:
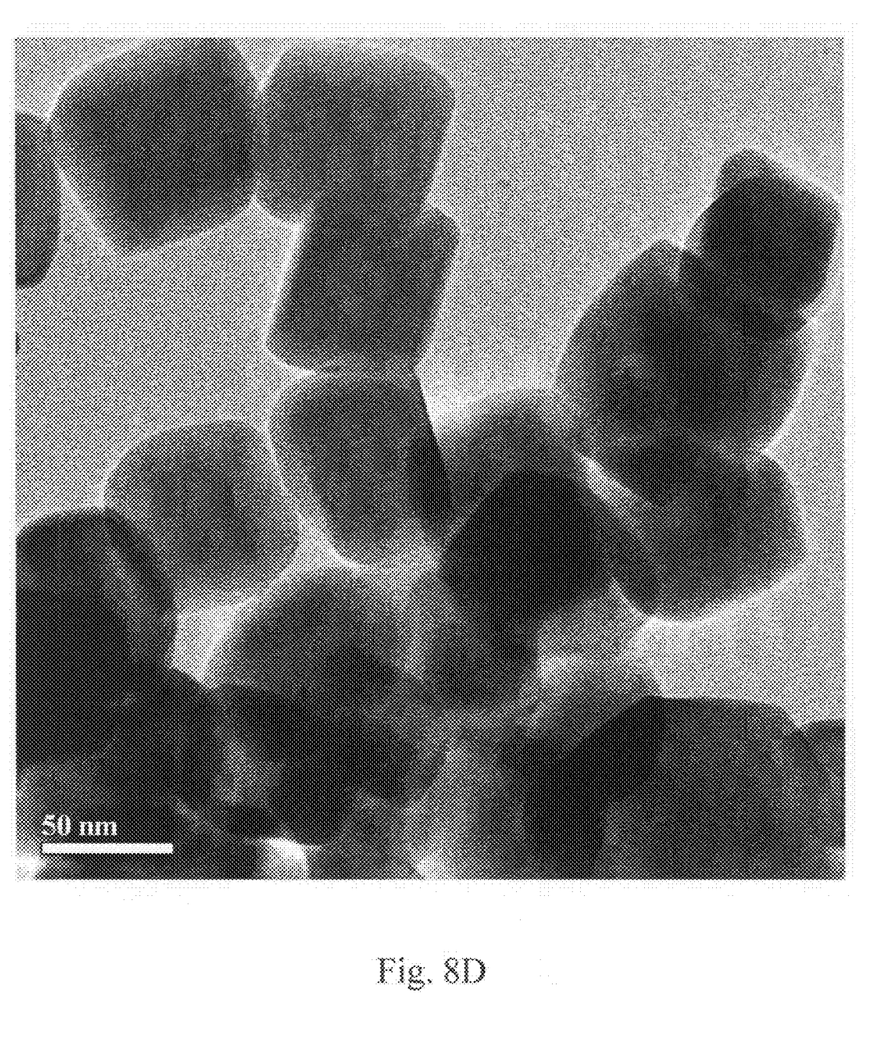
FIG. 8D is the electro-microscopic image of an embodiment of substantially non-spheral nano-particles which have different shape from FIG. 8A to FIG. 8C.

The nano-particles comprised in the composition for material surface treatment of the invention prefer to particles having particle size of 1 nm to 100 nm. In some preferred embodiments, these nano-particles have substantially non-spheral appearance. Furthermore, said nano-particles can comprise two or more different sizes or shapes, such as the nano-particles having different sizes shown in FIGS. 8A, 8B and 8C, and the nano-particles having different shape shown in FIG. 8D. Seeing that the surface area of nano-particles is larger than original particles, the protection layer formed by these particles is compact, and a discontinuous rough surface, as shown in FIG. 3D, can be formed by blending nano-particles of different sizes or shapes, the water-repellency, roughness, and mobility of the film formed by the composition can be increased by the application of the above nano-particles. The material known to be used to form nano-particles comprises, but not limit to, silicon dioxide, titanium dioxide, zinc oxide, aluminum oxide, calcium carbonate, magnesium silicate or mixtures thereof.

In some embodiments, the nano-particles comprised in the composition for material surface treatment of the invention can be partly replaced by micro-particles, such micro-particles comprises, but not limit to, silicon dioxide, zinc oxide, titanium dioxide, calcium carbonate, aluminum oxide, magnesium silicate or mixtures thereof. Through the blending of nano-particles and micro-particles, the material surface which formed a film from the composition of the present invention can have irregular roughness effect; hence, not only high water-repellency, which comes from low surface energy, but also good water-droplet rolling performance will be achieved. It will be easily understood that the micro-particles, which are used to replace nano-particles, can further be a micro-particles mixture by mixing two or more micro-particles, and the aim and effect should be the same as blending nano-particles.

In some embodiments, the surface of the nano-particles and/or micro-particles comprised in the composition of the invention can further be fluorinated. Since it is well known in the art that fluorinated material surfaces have good water- and oil-repellency, other materials and technologies can be used to form a hydrophobic layer on the surface of nano-particles and/or micro-particles can be used in the present invention without excessive details. For example, the nano-particles and/or micro-particles coated by polytetrafluoroethylene can be used in the compositions of the art.

The resin comprised in the composition for material surface treatment of the invention is used to produce the durability of the film after its formation. The resins known to be used comprises, but not limit to, acrylic resin, epoxy resin, silicone resin or mixtures thereof.

In some embodiments, the composition for material surface treatment of the invention can further comprise 0.1 to 30 parts by weight of water-soluble substances. In preferred embodiments, the amount of said water-soluble substances is 0.1 to 20 parts by weight. The species of the water-soluble substance comprises, but not limit to, salts (e.g. calcium carbonate or sodium sulfate), saccharides or mixtures thereof. The water-soluble substances are used to enhance the roughness of the film surface because the water-soluble substances will be dissolved and the film formed by the composition for material surface treatment of the invention will have pores after contacting the film with water.

In some embodiments, the composition for material surface treatment of the invention can further comprise 0.1 to 30 parts by weight of animal repellent. The application of animal repellent will make the car having a protective film formed by the composition for material surface treatment of the invention exhale an odor which animals, such as cats and dogs, dislike and intend to not approach, thereby reducing the opportunities that cats and dogs pee on the engine steel cover having a baked coating layer and the side surface of cars respectively, and further prolonging the life of the material and cars. The animal repellent suitable for adding into the present invention is, for example, alkyl ketone.

Applying the composition for material surface treatment of the invention on a surface of a material, on which a film will be formed, and rubbing the surface by a soft material to make the composition uniform observed by naked eyes, that is, forming a hydrophobic film on the surface of the material. Therefore, the present invention comprises a material having a hydrophobic surface, comprising: a material having a surface; and a hydrophobic film located on said surface; wherein said hydrophobic film is fabricated by using the composition for material surface treatment of the invention and coating the composition on the surface of said material. However, it will be easily understood that the final constitution of the film formed by the composition for material surface treatment of the invention will be different from the original constitution because of vaparization of solvents during coating process, dissolution of water-soluble substances by rain, and the like. In addition, the roughness of the surface can be produced and the hydrophobic effect of the film can be maintained. Therefore, the material having a hydrophobic surface of the present invention comprises a material comprising metal having no baked coating layer on its surface, metal having a baked coating layer on its surface, wood material, ceramic, leather or glasses; and a hydrophobic film. And said hydrophobic film is fabricated by using the composition for material surface treatment of the invention and coating the composition on a surface of a material.

The embodiment below is used to further understand the advantages of the present invention, not used to limit the claims of the invention.

EXAMPLE 1

The Composition for Material Surface Treatment of the Invention

To further explain and demonstrate the effect of the composition for material surface treatment of the invention, formulating the composition of this embodiment by the proportion herein: 100 parts by weight of wax; 20 parts by weight of silicone oil; 200 parts by weight of C6 to C30 hydrocarbon mixtures; 10 parts by weight of titanium dioxide micro-particles PTFE; 190 parts by weight of titanium dioxide nano-particles; and 5 parts by weight of resin. After blending these components to homogenous state, the blend is subjected to the tests disclosed in the following example.

EXAMPLE 2

The Examinations for the Composition for Material Surface Treatment of the Invention After applying the composition for material surface treatment of the invention to the steel plate having a baked coating layer, examining the characteristics of the surface by the examination standard ASTM D3836-94 Standard Practice for Evaluation of Automotive Polish, and the results obtained are shown in Table 1 below.

TABLE 1

The examination results of ASTM D3836-94

| Examinations items | Results |
|---|---|
| 9.2.1 ease of application(1 = not easy to be spread ... 5 = easy to be spread) | 3.9 |
| 9.2.2 cleaning(1 = discolor ... 5 = not discolor) | 4.1 |
| 9.2.3 drying rate(1 = slow ... 5 = fast) | 3.7 |
| 9.2.4 ease of wipe off (1 = not easy ... 5 = easy) | 4.4 |
| 9.2.5 powdering(1 = yes ... 5 = no) | 4.9 |
| 9.2.6 ease of rub up to maximum gloss (1 = many ... 5 = few) | 3.6 |
| 9.3.1 gloss (1 = dark ... 5 = bright) | 3.6 |
| 9.3.2 uniformity (1 = heterogenous ... 2 = homogenous) | 4.1 |
| 9.3.3 distinctness of image (1 = broken ... 5 = complete) | 3.8 |
| 9.3.4 smear and mar resistance (1 = yes ... 5 = no) | 4.4 |
| 9.3.5 film healing (1 = no ... 5 = yes) | 3.2 |
| 9.3.6 rebuffability (1 = no ... 5 = yes) | 3.8 |
| 9.3.7 cleaning (1 = no ... 5 = yes) | 3.5 |
| 9.3.8 water spotting (1 = yes ... 5 = no) | 4.0 |
| 9.3.9 gloss retention (1 = not gloss ... 5 = gloss) | 2.9 |
| 9.3.10 dusts attraction (1 = dusty ... 5 = not dusty) | 2.5 |
| Total | 60.3 |

From table 1 above, the hydrophobic film formed on a surface of a material by the composition for material surface treatment of the invention actually has the characteristics coming up to the examination standard, and answer to the needs of car care.

EXAMPLE 3

The Water-Repellency Comparison of the Composition for Material Surface Treatment of the Example 1 and Commercial Products Table 2 below is the water-repellency comparison of commercial products and the composition for material surface treatment of the example 1, and the names of these commercial products are listed in the Note 1 under Table 2.

TABLE 2 the characteristics comparison of commercial products and this embodiment

| | Commercial Product A | Commercial Product B | Commercial Product C | Commercial Product D | Example 1 |
|---|---|---|---|---|---|
| The water-droplet rolling performance | 4 | 2 | 2 | 3 | 5 |
| The test of | 4 | 2 | 2 | 3 | 5 |

TABLE 2-continued the characteristics comparison of commercial products and this embodiment

|  | Commercial Product A | Commercial Product B | Commercial Product C | Commercial Product D | Example 1 |
|---|---|---|---|---|---|
| water trace Contact Angle | 107 | 100 | 98 | 95 | 106 |
| The test of water stain | None | Many | Many | Many | Many |
| The easiness to wipe | 4 | 2 | 2 | 4 | 5 |

Note 1:
Commercial Product A is "カンスイリョフ®" of SOFT99;
Commercial Product B is 3M ultra high glass finish paste wax hard;
Commercial Product C is Turtle wax Ultra gloss paste wax Platinum series;
Commercial Product D is SONAX Xxtreme polish wax.

From Table 2, it should be known that the composition of the example 1 has more excellent characteristics than the commercial products over every test. To further display the water-droplet rolling performance of the composition of the example 1, the actual image of the water-droplet rolling performance of commercial products and example 1 is shown in FIG. 1.

Figure 1:
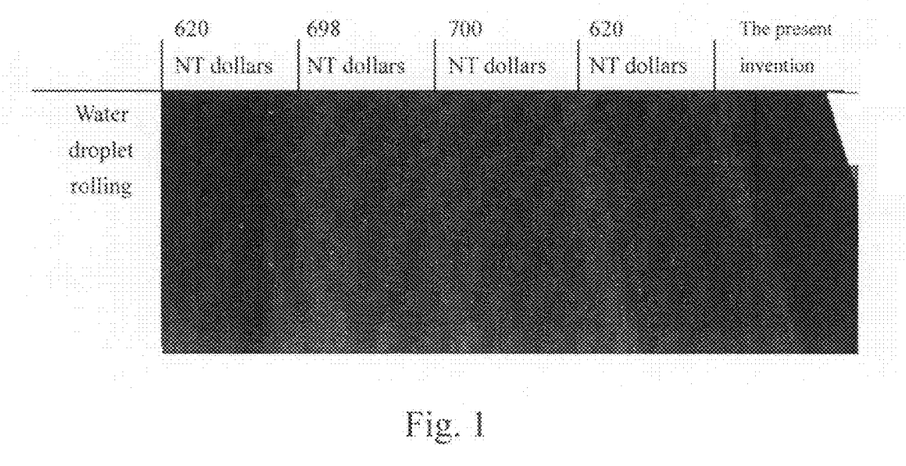
FIG. 1 is the actual image of water-droplet rolling performance of commercial products and the composition of this invention.

FIG. 1 shows that after applying the four commercial products and the example 1 on the same car steel plate having a baked coating layer, the one which the number of water-droplet residues is the least is the composition of the example 1, and it shows that the water-droplet rolling ability of the hydrophobic film formed form the composition of the present invention is the best.

EXAMPLE 4

The Applications of the Composition for Material Surface Treatment of the Present Invention on Various Materials In this example, the composition for material surface treatment is applied on the surfaces of various different materials, which is demonstrated in FIGS. 2 to 7.

Figure 2:
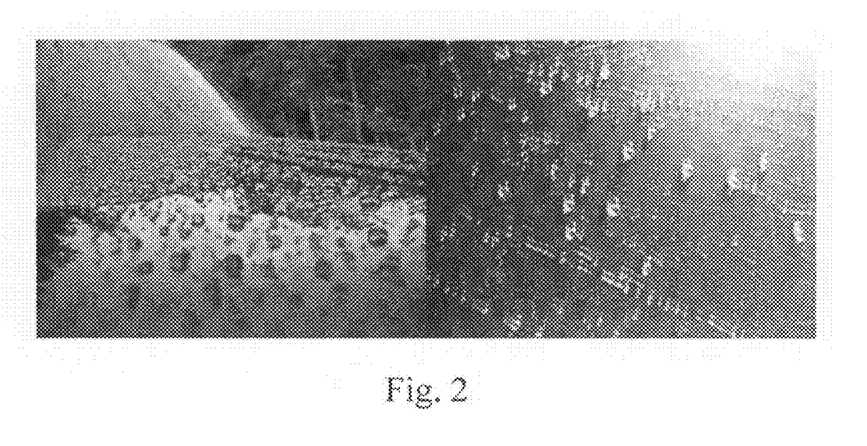
FIG. 2 is the actual image of applying the composition for material surface treatment of the present invention on a engine hood.

FIG. 2 is the actual image of applying the composition for material surface treatment of the example 1 on real car engine hood, wherein the image on the right is the partial amplification of the image on the left. In this figure, clearly recognizable water-droplets can be seen, wherein the water molecules are cohered because the water-repellency is high.

Figure 3A:
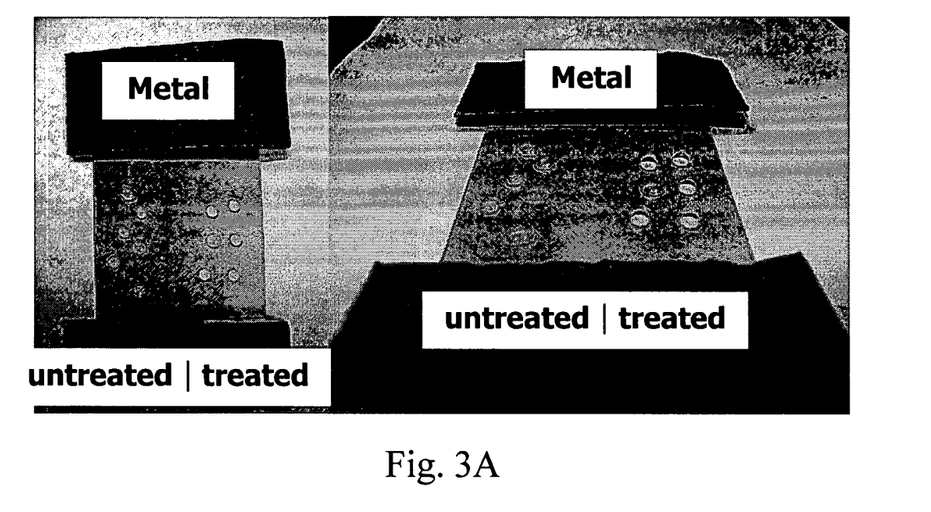
FIG. 3A is the actual image of a stainless steel surface having no baked coating layer, wherein the surface is treated (right) or not treated (left) by the composition for material surface treatment of the present invention.

FIG. 3A is the actual image of a stainless steel surface having no baked coating layer, wherein the surface is treated (right) or not treated (left) by the composition for material surface treatment of the example 1. It can be seen that the water molecules in this image have better cohesion effect on the treated stainless steel surface.

Figure 3B:
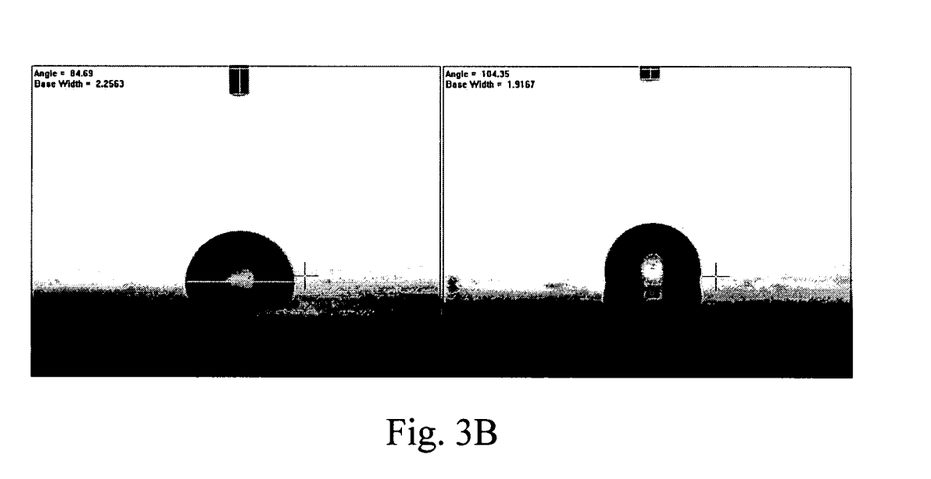
FIG. 3B is the image of the contact angle of the water-droplets on the stainless steel surface of stainless steel shown in FIG. 3A.

FIG. 3B is the contact angle measurement of the water-droplets on the stainless steel surface shown in FIG. 3A, wherein the image on the left side of FIG. 3B is the image of water-droplet's contact angle on the untreated stainless steel surface, and the image on the right side is the image of water-droplet's contact angle on the stainless steel surface that is treated by the composition for material surface treatment of the example 1. It can be seen that the water-droplet on the treated stainless steel surface has larger contact angle and better water-repellency.

Figure 3C:
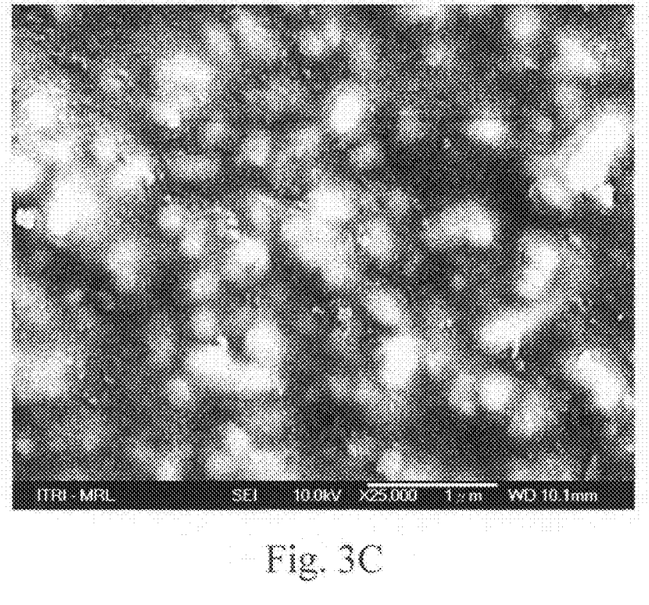
FIG. 3C is the electro-microscopic image of the stainless steel surface of stainless steel not treated by the composition of this invention shown in FIG. 3A.
Figure 3D:
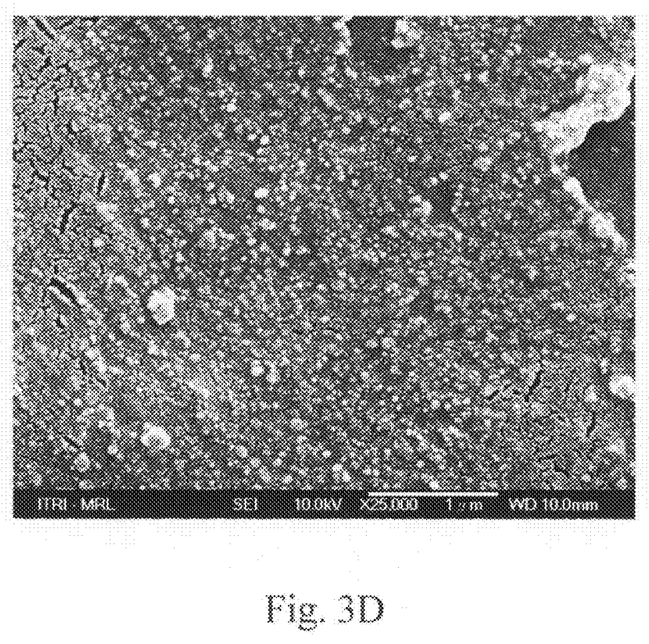
FIG. 3D is the electro-microscopic image of the stainless steel surface of stainless steel treated by the composition of this invention shown in FIG. 3A.

FIG. 3C is the electro-microscopic image of the stainless steel surface not treated by the composition of the example 1. The surface shows that it is a rough surface having no nano-structure. FIG. 3D is the electro-microscopic image of the stainless steel surface of FIG. 3C, which is further treated by the composition for material surface treatment of the example 1. The surface structure forms a rough and uneven cilia-like hydrophobic nano-structure.

Figure 4A:
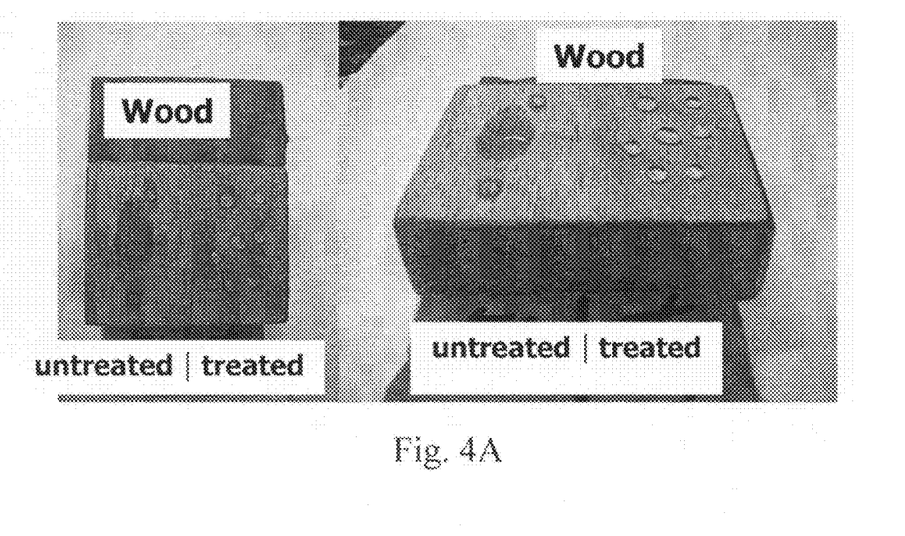
FIG. 4A is the actual image of a wooden surface, wherein the surface is treated (right) or not treated (left) by the composition for material surface treatment of the present invention.

FIG. 4A is the actual image of a wooden surface, wherein the surface is treated (right) or not treated (left) by the composition for material surface treatment of the example 1. It can be seen that the water molecules in this image have better cohesion effect on the treated wooden surface.

Figure 4B:
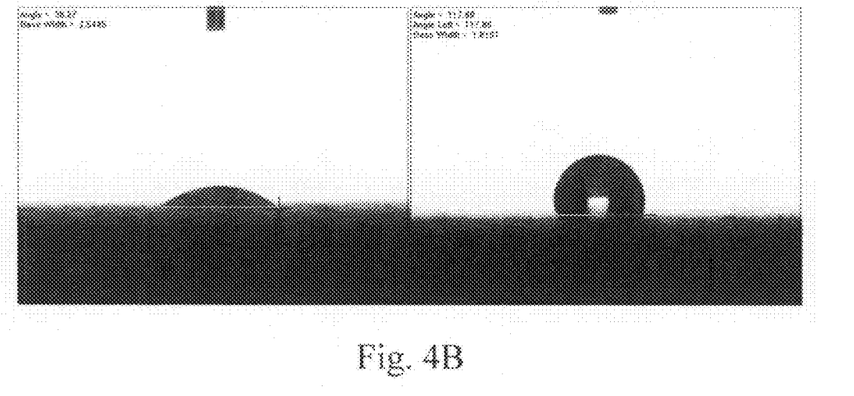
FIG. 4B is the image of the contact angle of the water-droplets on the wooden surface shown in FIG. 4A.

FIG. 4B is the contact angle measurement of the water-droplets on the wooden surface shown in FIG. 4A, wherein the image on the left side of FIG. 4B is the image of water-droplet contact angle on the untreated wooden surface, and the image on the right side is the image of water-droplet contact angle on the wooden surface that is treated by the composition for material surface treatment of the example 1. It can be seen that the water-droplet on the treated wooden surface has larger contact angle and better water-repellency.

Figure 5A:
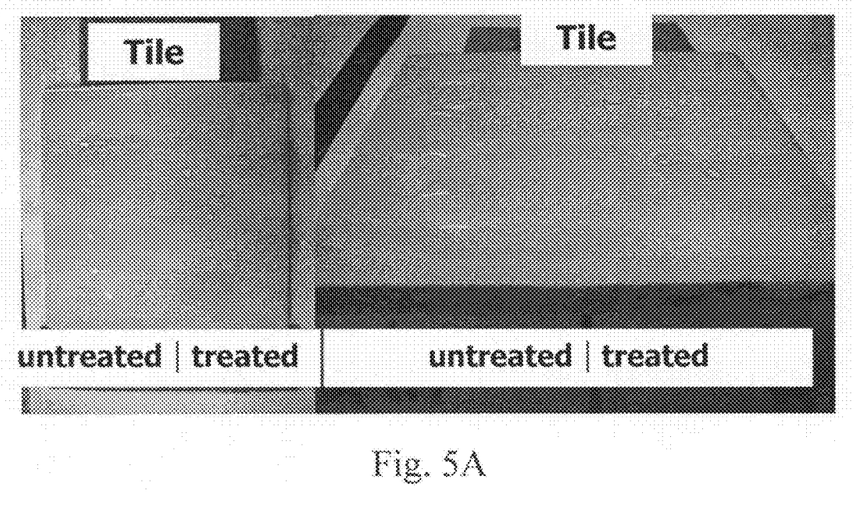
FIG. 5A is the actual image of a tile surface, wherein the surface is treated (right) or not treated (left) by the composition for material surface treatment of the present invention.

FIG. 5A is the actual image of a tile surface, wherein the surface is treated (right) or not treated (left) by the composition for material surface treatment of the example 1. It can be seen that the water molecules in this image have better cohesion effect on the treated tile surface.

Figure 5B:
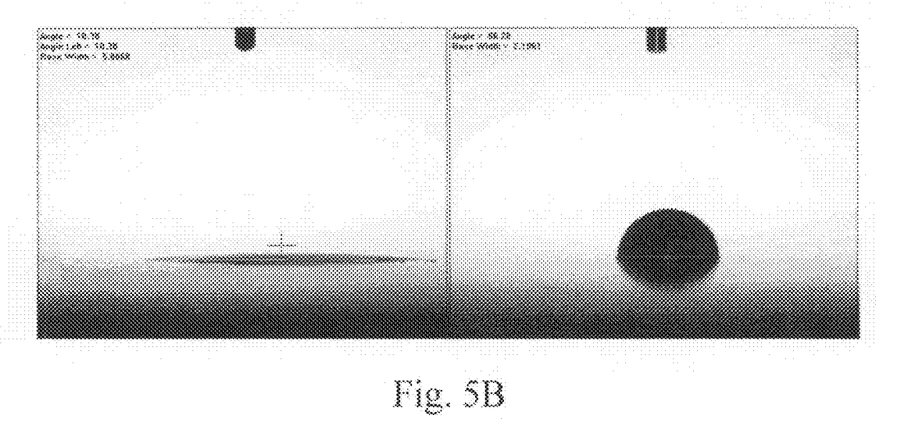
FIG. 5B is the image of the contact angle of the water-droplets on the tile surface in FIG. 5A

FIG. 5B is the contact angle measurement of the water-droplets on the tile surface shown in FIG. 5A, wherein the image on the left side of FIG. 5B is the image of water-droplet contact angle on the untreated tile surface, and the image on the right side is the image of water-droplet contact angle on the tile surface that is treated by the composition for material surface treatment of the example 1. It can be seen that the water-droplet on the treated tile surface has larger contact angle and better water-repellency.

Figure 6A:
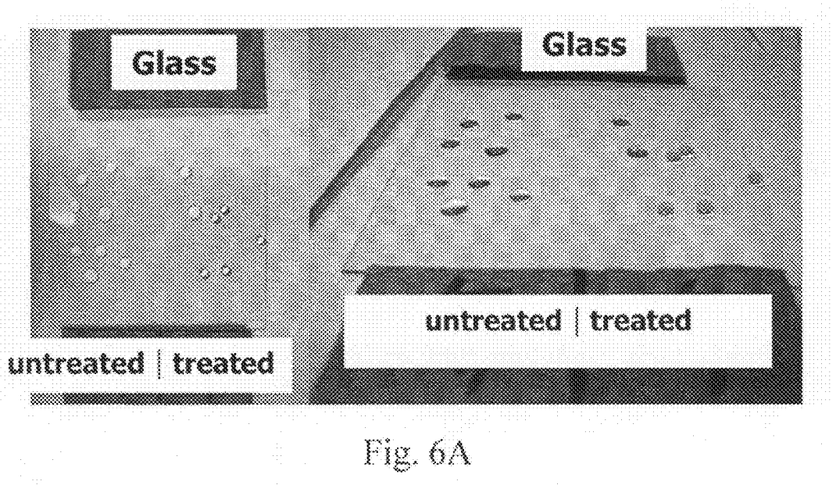
FIG. 6A is the actual image of a glass surface, wherein the surface is treated (right) or not treated (left) by the composition for material surface treatment of the present invention.

FIG. 6A is the actual image of a glass surface, wherein the surface is treated (right) or not treated (left) by the composition for material surface treatment of the example 1. It can be seen that the water molecules in this image have better cohesion effect on the treated glass surface.

Figure 6B:
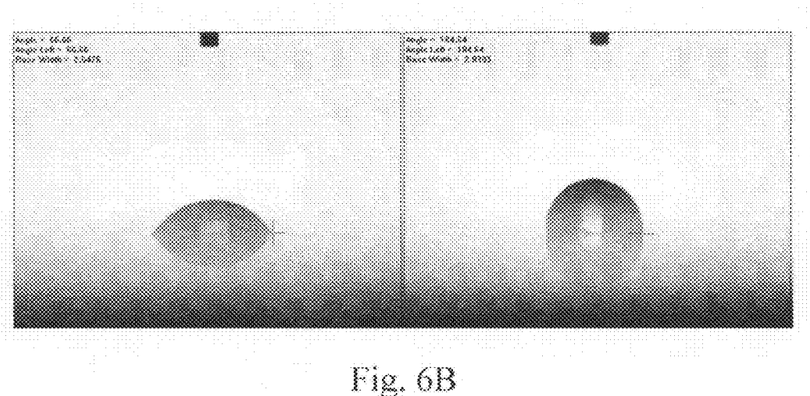
FIG. 6B is the image of the contact angle of the water-droplets on the glass surface in FIG. 6A

FIG. 6B is the contact angle measurement of the water-droplets on the glass surface shown in FIG. 6A, wherein the image on the left side of FIG. 6B is the image of water-droplet contact angle on the untreated glass surface, and the image on the right side is the image of water-droplet contact angle on the glass surface that is treated by the composition for material surface treatment of the example 1. It can be seen that the water-droplet on the treated glass surface has larger contact angle and better water-repellency.

Figure 7:
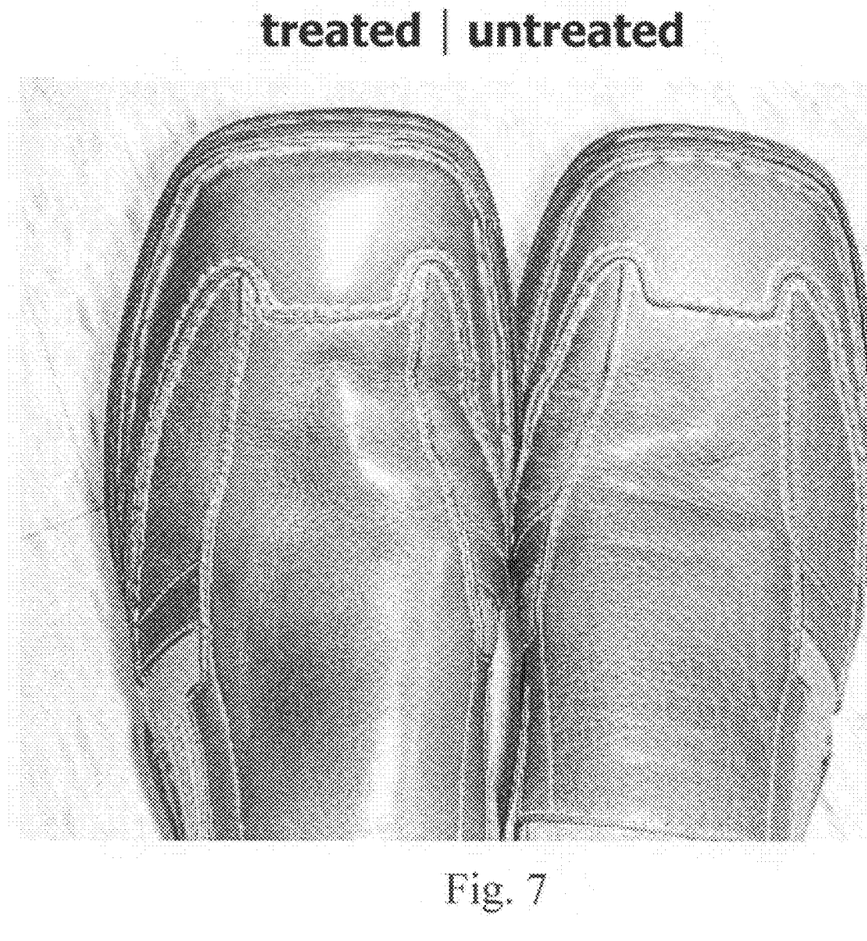
FIG. 7 is the actual image of shoe (leather) surfaces, wherein the surfaces are treated (left) or not treated (right) by the composition for material surface treatment of the present invention.

FIG. 7 is the actual image of shoe (leather) surfaces, wherein the surfaces are treated (left) or not treated (right) by the composition for material surface treatment of the example 1. It can be seen that the treated leather surface has better visual effect of evenness and gloss.

From these drawings and examples, it can be known that the composition for material surface treatment of the example 1 can be practically used in surface treatment of various materials, and form a hydrophobic film having high water-repellency and good water-droplet rolling performance on the surface of various materials.

In summary, a rough and uneven, or twist and wrinkling film can be produced on a surface of a material by using the composition for material surface treatment of the present invention. Moreover, since particles are added, a rough and uneven cilia-like hydrophobic nano-structure can be produced and the high hydrophobic effect can be achieved. The design of this composition constitution can stabilize the nano-particles in the wax and further help dissolving the cat and dog repellents. Adding high molecular compounds in the wax formulation will enable the film of said high molecular compounds contact with air while the film is formed on the baked coating layer, and form a complete gloss film.

Other Embodiments

Every characteristic disclosed in this specification can be combined with other methods, and each characteristic disclosed in this specification is capable to be selectively replaced by the characteristic having the same, equal, or similar purposes. Therefore, every characteristics disclosed in this specification is only one example of these equal or similar characteristics with the exception of the specifically obvious ones.

Although the present invention has been disclosed above by the preferred examples, which are not used to limit the present invention, one skilled in the art can make various changes and modifications within the spirit and scope of this invention.

What is claimed is:

1. A hydrophobic composition for material surface treatment, comprising:
   100 parts by weight of wax;
   0.1 to 40 parts by weight of silicone oil;
   10 to 500 parts by weight of C6 to C30 hydrocarbon mixtures;
   1 to 200 parts by weight of nano-particles; and
   1 to 40 parts by weight of resin;
   wherein said composition does not comprise any water.

2. The composition according to claim 1, comprising:
   100 parts by weight of wax;
   0.1 to 20 parts by weight of silicone oil;
   10 to 400 parts by weight of C6 to C30 hydrocarbon mixtures;
   1 to 100 parts by weight of nano-particles; and
   1 to 20 parts by weight of resin.

3. The composition according to claim 1, wherein said material comprises metal having no baked coating layer on its surface, metal having a baked coating layer on its surface, wood material, ceramic, leather or glass.

4. The composition according to claim 1, wherein said wax comprises petroleum wax, beeswax, Brazil wax, Carnauba wax or mixtures thereof.

5. The composition according to claim 1, wherein said C6 to C30 hydrocarbon mixtures is straight or branched alkane compound having a formula $C_n H_{2n+2}$, wherein $n=6$-30, or mixtures thereof.

6. The composition according to claim 1, wherein said C6 to C30 hydrocarbon mixtures is cycloalkane, aromatic compound, or unsaturated hydrocarbon having 6 to 30 carbon atoms, or mixtures thereof.

7. The composition according to claim 5, wherein said C6 to C30 hydrocarbon mixtures comprises cleaning naphtha, toluene, xylene, gasoline, diesel, kerosene, Stoddard solvent or mixtures thereof.

8. The composition according to claim 6, wherein said C6 to C30 hydrocarbon mixtures comprises cleaning naphtha, toluene, xylene, gasoline, diesel, kerosene, Stoddard solvent or mixtures thereof.

9. The composition according to claim 1, wherein said nano-particles are made from silicon dioxide, titanium dioxide, zinc oxide, calcium carbonate, aluminum oxide, magnesium silicate or mixtures thereof.

10. The composition according to claim 1, wherein the surface of said nano-particles can further be fluorinated.

11. The composition according to claim 1, wherein said nano-particles having two or more shapes and/or particle sizes.

12. The composition according to claim 1, wherein said nano-particles are partially replaced with micro-particles.

13. The composition according to claim 12, wherein said micro-particles are made from silicon dioxide, zinc oxide, titanium dioxide, calcium carbonate, aluminum oxide, magnesium silicate or mixtures thereof.

14. The composition according to claim 12, wherein the surface of said micro-particles can further be fluorinated.

15. The composition according to claim 1, wherein the resin comprises acrylic resin, epoxy resin, silicone resin or mixtures thereof.

16. The composition according to claim 1, which further comprises 0.1 to 30 parts by weight of water-soluble substances, wherein the water-soluble substances are used to enhance the roughness of a film surface fabricated by said composition.

17. The composition according to claim 16, wherein the amount of said water-soluble substances is 0.1 to 20 parts by weight.

18. The composition according to claim 16, wherein said water-soluble substances comprises salts, saccharides or mixtures thereof.

19. The composition according to claim 18, wherein said salts comprises calcium carbonate, calcium sulfate or mixtures thereof.

20. The composition according to claim 1, which further comprises 0.1 to 30 parts by weight of animal repellent.

21. The composition according to claim 20, wherein said animal repellent is ketone.

22. A material having a hydrophobic surface, comprising:
    a material having a surface; and
    a hydrophobic film located on said surface;
    wherein said hydrophobic film is fabricated by using the composition for material surface treatment of claim 1 and coating the composition on the surface of said material.

23. The material having a hydrophobic surface according to claim 22, wherein the material comprises metal having no baked coating layer on its surface, metal having a baked coating layer on its surface, wood material, ceramic, leather or glasses.

24. A hydrophobic film, which is fabricated by using the composition for material surface treatment of claim 1 and coating the composition on a surface of a material.

* * * * *